Sept. 16, 1952 M. W. KENNEY 2,610,858

AUTOMATIC PHONOGRAPH

Filed Dec. 9, 1949

INVENTOR
Mahlon W. Kenney
BY John F. Eakins
ATTORNEY

Patented Sept. 16, 1952 2,610,858

UNITED STATES PATENT OFFICE 2,610,858

AUTOMATIC PHONOGRAPH

Mahlon W. Kenney, Oak Park, Ill., assignor to J. P. Seeburg Corporation, Chicago, Ill., a corporation of Illinois Application December 9, 1949, Serial No. 131,991

4 Claims. (Cl. 274—10)

This invention relates to automatic phonographs and more particularly to a record handling member or lever for removing a record from a magazine and returning it thereto. This invention is particularly applicable to the type of phonograph described and claimed in Patents Nos. 2,281,547 (Re. 22,551), 2,281,548 and 2,323,365, but it can be employed with other phonographs. In the machines of the patents referred to, the records are supported in vertical position in a magazine upon two supports. Spacers are provided in the magazine to define individual record receiving pockets. The phonograph includes a playing unit which is movable relatively to the magazine so that it can cooperate with any individual record. The record playing unit comprises clamping means which engage any record brought out, supported and rotated for reproduction. The record playing unit comprises a lever which swings a record from the magazine outwardly to the clamping means by rolling motion. After playing, the record drops into engagement with the lever, which, by reverse movement, leads it back to its pocket in the magazine.

One of the difficulties experienced with a machine of this type, resides in the fact that any large bunch of records includes several which are warped. It is, of course, desired to keep the magazine reasonably small and at the same time to tolerate a considerable degree of warpage in the records. The difficulty is experienced most with a played record which is released for return to the magazine. When the record is in the magazine, its position is limited by the guides on either side of it, so that it is a much more simple matter for the lever effectively to engage it.

In accordance with the present invention, I provide the record handling lever at its effective end with means which are normally contracted, but which are expanded when the record is moved out for clamping. Such means are in the form of arms which are normally spaced so that they engage only one record in the magazine and which diverge when the record is moved out. These diverging or open arms enable a record with considerable warpage to be received again by the diverging arms and led into its proper place in the magazine.

The invention will readily be understood from the following description of a preferred embodiment thereof, taken in conjunction with the accompanying drawings, in which.

Figure 1:
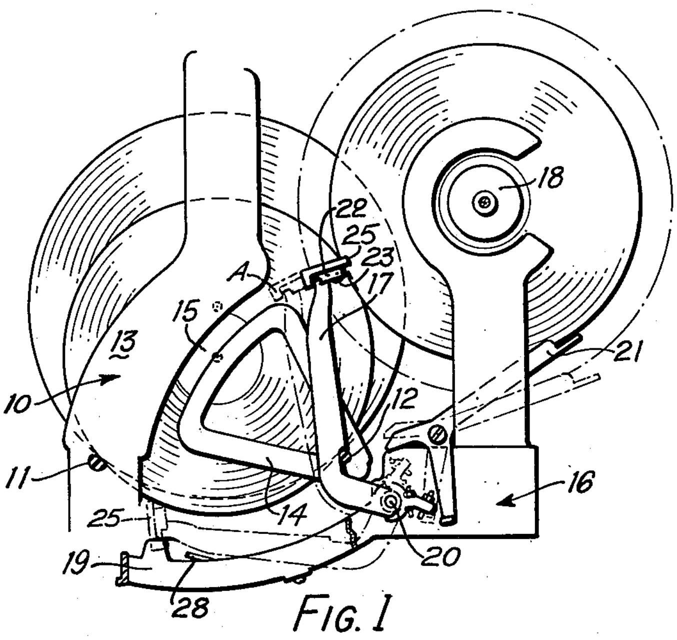
Figure 1 is an elevational view of a phonograph embodying my invention.
Figure 3:
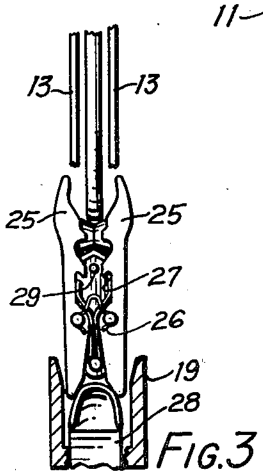
Fig. 3 is a similar view showing the record lifting means in a higher position.
Figure 6:
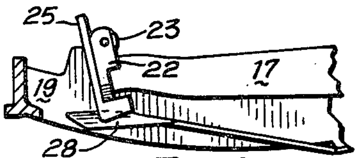
Fig. 6 is a side view showing the record lifting lever and associated parts in elevation in position corresponding to Fig. 3.
Figure 7:
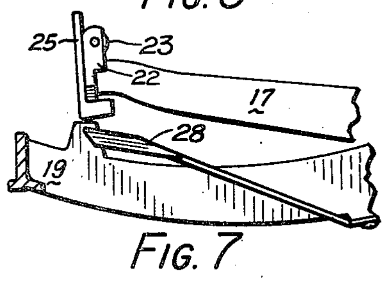
Fig. 7 is a similar view corresponding to the position of Fig. 4.

Referring to the drawings and particularly to Figure 1, the magazine, referred to generally by the reference numeral 10, comprises a pair of record supports 11 and 12 upon which the record rests in roost-like fashion. Two aligned spacer elements 13 and 14 are provided between adjacent record positions so as to support each record in vertical position. The spacer elements 13 and 14 provide between them, an arcuate path 15 to accommodate the record elevating elements. The phonograph includes a playing unit 16 which is movable along the magazine and is capable of being arrested in any of a plurality of positions with the record removing lever 17 in register with one of the record positions. The playing unit includes clamping means 18 which engage and support a record for playing. The lever 17 is normally located in its lowermost position as shown in Fig. 6, being substantially within a double walled bracket 19 which carries at its outer end selecting means (not shown) when the lever 17 is in this position, it passes freely beneath the records in the magazine as the playing unit moves along it. When the playing unit is arrested in a selected position, the lever 17 moves upwardly about its pivotal axis 20 and elevates the record which it engages upwardly towards playing position. The playing unit includes a runway 21 on which the record rolls upwardly. When a 10 inch record is moved out, the runway 21 remains in the full line position in Fig. 1, and the lever 17 moves into its full line position shown in this figure. The clamping means 18 is arranged so as to lift the record away from the lever 17 and from the runway 21 for playing. When the record is played, the clamping means are disengaged and the record again engages the runway 21 and the mechanism at the end of the lever 17 then moves downwardly again into its normal position (Fig. 6), thus leading the played record back into its position in the magazine. When a 12 inch record is moved out, the runway 21 moves into its phantom position in Fig. 1, and the lever 17 moves up only to its phantom position marked A. The clamping means 18 again elevates the record clear of the lever 17 and the runway 21 for playing.

Figure 2:
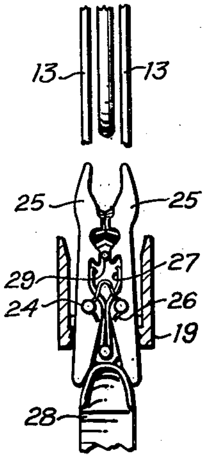
Fig. 2 is a sectional detail showing the record lifting means in normal condition.
Figure 4:
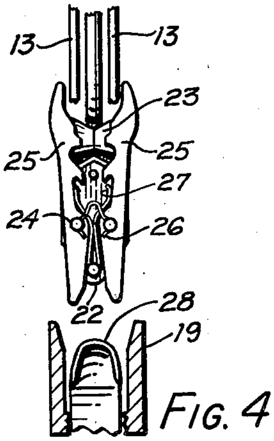
Fig. 4 is a similar view showing the record lifting means in a still higher position.
Figure 5:
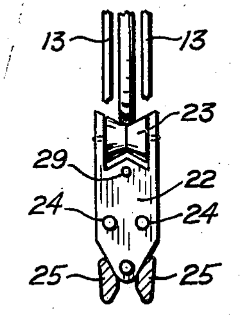
Fig. 5 is a similar view with the arms removed to show the manner in which they are mounted.

Upon the end of the lever 17, I mount a plate-like structure 22, the upper portion of which is bifurcated to provide a mounting for hour-glass roller 23 which engages the periphery of the record as shown in Fig. 5. Upon the element 22, I provide two studs 24 to serve as pivots for two small levers 25. These levers are retained in position by a spring clip 26. A spring 27 mounted between the levers applies pressure to their upper portions so that they tend to diverge in the manner shown in Fig. 4. When the lever 17 is in its normal or lowermost position as shown in Figs. 2 and 6, the lower end of the levers 25 are engaged by a semi-circular portion of a leaf spring 28 which is supported on the bracket 19. This brings abutments on the levers 25 into engagement with a stop pin 29 carried by the element 22. The upper ends of the levers 25 are pointed and are spaced by a distance approximately equal to the spacing of the spacer elements 13, 14. When the lever 17 is about to move upwardly, the upper pointed ends of the levers 25 are in alignment with the spacer elements 13, 14. As the lever 17 moves upwardly, the spring 28 follows it and maintains this relationship of the upper points of the levers 25 until these points have passed the lower edges of the records in the magazine. Consequently, only the record located between the spacers with which the points of the levers 25 are in alignment, is engaged by the lever 17 and elevated upwardly. After this correct engagement has been determined, the levers 25 move away from the spring 28 and their upper ends tend to diverge in the position shown in Fig. 4. When the lever 17 is in its uppermost position, that is the full line position shown in Fig. 1, or its position A shown in that figure, the arms 25 are in the position shown in Fig. 1, ready to receive the record when it is released. It is to be noted that during playing, the record is displaced slightly away from the roller 23, but its periphery remains between the outstretched upper ends of the levers 25 so that reengagement of the released record is insured. As the lever 17 moves downwardly again, the record follows it, riding on the roller 23 and when the lever 17 is moved down towards its normal position, the lower ends of the levers 25 engage the spring 28 so that the upper end of the levers 25 are again brought to normal position with the same spacing as the spacer elements 13, 14.

Although the invention has been described in connection with the specific details of a preferred embodiment thereof, it must be understood that such details are not intended to be limitative of the invention except insofar as set forth in the accompanying claims.

Having thus described my invention, I declare that what I claim is:

1. An automatic phonograph comprising supporting means and spacers for a plurality of records, a lever having a normal position clear of said spacers and records, actuating means for moving said lever from and to said normal position and between adjacent spacers to effect and control outward and inward movements of a record located between said adjacent spacers, a pair of outwardly directed arms on said lever, means biassing said arms into divergent relation, and a separate member engaged by said arms in the normal position of said lever for moving them into closer spacing.

2. An automatic phonograph comprising supporting means and spacers for a plurality of records, a lever having a normal position clear of said spacers and records, actuating means for moving said lever from and to said normal position and between adjacent spacers to effect and control outward and inward movements of a record located between said adjacent spacers, a pair of outwardly directed arms on said lever, means biassing said arms into divergent relation, a separate member engaged by said arms in the normal position of said lever for moving them into closer spacing, and means biassing said separate member towards an intermediate position of said lever, whereby it follows said lever during the initial part of its movement from normal position and thereafter separates from the lever, causing said arms to separate to more divergent condition.

3. In an automatic phonograph having a pair of record supporting members and spacers for maintaining records vertical on said supports and in spaced relation, a transfer arm having a normal position below said spacers and records, actuating means for moving said transfer arm upwardly and downwardly from and to said normal position and between adjacent spacers to control the upward and downward movements of a record between said adjacent spacers, a pair of upwardly directed levers mounted on said transfer arm biassed so that their upwardly projecting ends diverge at a wide angle, and a separate member arranged to engage the lower ends of said levers when the transfer arm is near its normal position to reduce the divergence of their upper ends.

4. In an automatic phonograph having a pair of record supporting members and spacers for maintaining records vertical on said supports and in spaced relation, a movable transfer arm having a normal position below said spacers and records, actuating means for moving said transfer arm upwardly and downwardly from and to said normal position and between adjacent spacers to control the upward and downward movements of a record between said adjacent spacers, a pair of upwardly directed levers mounted on said transfer arm biassed so that their upwardly projecting ends diverge at a wide angle, a separate member arranged to engage the lower ends of said levers when the transfer arm is in said normal position to reduce the divergence of their upper ends, and means biassing said separate member towards an intermediate position of said lever, whereby it follows said lever during the initial part of its movement from normal position and thereafter separates from the lever, causing said arms to separate to move divergent condition, said intermediate position being located so that the upper ends of the levers are past the lower edge of the record to be elevated before the transfer arm separates from said separate member.

MAHLON W. KENNEY.

REFERENCES CITED

The following references are of record in the file of this patent:

UNITED STATES PATENTS

| Number | Name | Date |
|---|---|---|
| 1,590,654 | Smith | June 29, 1926 |
| 2,064,868 | Yeider | Dec. 22, 1936 |